(12) United States Patent
Weisse et al.

(10) Patent No.: US 12,435,199 B2
(45) Date of Patent: Oct. 7, 2025

(54) MELAMINE FORMALDEHYDE FOAM WITH REDUCED FORMALDEHYDE EMISSION

(71) Applicant: BASF SE, Ludwigshafen am Rhein (DE)

(72) Inventors: Sebastian Alexander Weisse, Ludwigshafen am Rhein (DE); Zeljko Tomovic, Lemförde (DE); Horst Baumgartl, Ludwigshafen am Rhein (DE); Werner Lenz, Ludwigshafen am Rhein (DE); Tobias Heinz Steinke, Ludwigshafen am Rhein (DE); Bernhard Vath, Ludwigshafen am Rhein (DE); Iran Otero Martinez, Lemförde (DE)

(73) Assignee: BASF SE, Ludwigshafen am Rhein (DE)

( * ) Notice: Subject to any disclaimer, the term of this patent is extended or adjusted under 35 U.S.C. 154(b) by 867 days.

(21) Appl. No.: 17/607,967

(22) PCT Filed: Apr. 29, 2020

(86) PCT No.: PCT/EP2020/061892
§ 371 (c)(1),
(2) Date: Nov. 1, 2021

(87) PCT Pub. No.: WO2020/221800
PCT Pub. Date: Nov. 5, 2020

(65) Prior Publication Data
US 2022/0325063 A1    Oct. 13, 2022

(30) Foreign Application Priority Data

May 2, 2019 (EP) .................................... 19172375

(51) Int. Cl.
*C08J 9/40* (2006.01)
*B29C 44/56* (2006.01)
*B29C 45/14* (2006.01)

(52) U.S. Cl.
CPC ........... *C08J 9/405* (2013.01); *B29C 44/5618* (2013.01); *B29C 45/14795* (2013.01); *C08J 2201/02* (2013.01); *C08J 2361/28* (2013.01)

(58) Field of Classification Search
CPC .... C08J 2361/28; C08J 2201/02; C08J 9/405; C08J 9/40; B29C 45/14795; B29C 44/5618
See application file for complete search history.

(56) References Cited

U.S. PATENT DOCUMENTS

| | | | | |
|---|---|---|---|---|
| 4,125,664 A | * | 11/1978 | Giesemann | B32B 3/18 428/137 |
| 5,599,884 A | * | 2/1997 | Beleck | C09D 7/71 525/509 |
| 7,714,031 B2 | | 5/2010 | Baumgartl et al. | |
| 7,714,034 B2 | | 5/2010 | Moszner et al. | |
| 2005/0049321 A1 | | 3/2005 | Baumgartl et al. | |
| 2007/0138671 A1 | | 6/2007 | Anastasiou et al. | |
| 2008/0197524 A1 | * | 8/2008 | Baumgartl | C08J 9/0023 264/54 |
| 2010/0080831 A1 | * | 4/2010 | Braeckman | C11D 3/32 525/472 |
| 2010/0081606 A1 | | 4/2010 | Barger et al. | |
| 2011/0152159 A1 | | 6/2011 | Labeque | |
| 2012/0132851 A1 | | 5/2012 | Blanchard et al. | |
| 2012/0245267 A1 | | 9/2012 | Blanchard et al. | |
| 2013/0157028 A1 | * | 6/2013 | Blanchard | B32B 19/043 428/219 |
| 2015/0210814 A1 | | 7/2015 | Gross et al. | |
| 2016/0024319 A1 | | 1/2016 | Blanchard et al. | |
| 2018/0140157 A1 | | 5/2018 | Pung et al. | |
| 2020/0015651 A1 | * | 1/2020 | Bradbury | A47L 13/17 |

FOREIGN PATENT DOCUMENTS

| | | |
|---|---|---|
| CN | 101007259 A | 8/2007 |
| EP | 0017671 A1 | 10/1980 |
| EP | 0017672 A1 | 10/1980 |
| EP | 0037470 A1 | 10/1981 |
| EP | 0074593 A1 | 3/1983 |
| JP | 2014-069056 A | 4/2014 |
| JP | 2015-147211 A | 8/2015 |
| JP | 2015-527470 A | 9/2015 |
| JP | 2016-006178 A | 1/2016 |
| WO | 2001/094436 A2 | 12/2001 |
| WO | 2010/139897 A1 | 12/2010 |
| WO | 2015/009339 A1 | 1/2015 |
| WO | 2015/197744 A1 | 12/2015 |
| WO | 2017/207687 A1 | 12/2017 |
| WO | 2018/024559 A1 | 2/2018 |
| WO | 2019/030239 A1 | 2/2019 |

OTHER PUBLICATIONS

International Preliminary Report on Patentability received for PCT Patent Application No. PCT/EP2020/061892, mailed on Feb. 26, 2021, 14 pages.
International Search Report and Written Opinion received for PCT Patent Application No. PCT/EP2020/061892, mailed on Jun. 3, 2020, 9 pages.

* cited by examiner

*Primary Examiner* — Randy P Gulakowski
*Assistant Examiner* — Christina H. W. Rosebach
(74) *Attorney, Agent, or Firm* — Faegre Drinker Biddle & Reath LLP

(57) ABSTRACT

Method for lowering the formaldehyde emissions of melamine/formaldehyde polymer moldings, films or fibers by impregnating the melamine/formaldehyde polymer moldings, films or fibers with an aqueous solution of at least one formaldehyde scavenger.

2 Claims, No Drawings

MELAMINE FORMALDEHYDE FOAM WITH REDUCED FORMALDEHYDE EMISSION

CROSS-REFERENCE TO RELATED APPLICATIONS

This application is a national stage application (under 35 U.S.C. § 371) of PCT/EP2020/061892, filed Apr. 29, 2020, which claims benefit of European Application No. 19172375.8, filed May 2, 2019, both of which are incorporated herein by reference in their entirety.

The present invention relates to melamine/formaldehyde foams with reduced formaldehyde emission, methods for preparing these foams and solutions which can be used in these methods.

Open-cell resilient foams based on melamine/formaldehyde resins and processes for their production by heating with hot air, steam or microwave radiation with foaming and crosslinking of a blowing agent-containing solution or dispersion of a melamine/formaldehyde precondensate are known and are described, for example, in EP-A 17672 and EP-A 37470.

Foams based on formaldehyde resin emit small amounts of formaldehyde. The formaldehyde emission increases with increasing temperature and humidity. WO 01/94436 therefore describes a process for the production of foams based on the melamine/formaldehyde condensate having a low formaldehyde emission, an MF precondensate having a molar ratio of melamine to formaldehyde of more than 1:2 being used. In order to achieve very low formaldehyde emissions, the foam must be heated for a further 30 minutes at 220° C. after drying. After the heating, however, the foams have cured and are no longer thermoformable.

US 2008/0197524 A1 discloses a process for the production of foams by heating with foaming and crosslinking of a mixture comprising a melamine/formaldehyde precondensate, a curing agent and a blowing agent, wherein urea, substituted ureas, alkyl- or aryl-substituted melamine, urethanes, carboxamides, dicyandiamide, guanidine, sulfuryl amide, sulfonamides, aliphatic amines or glycols in amounts of from 2 to 10 wt %, based on the melamine/formaldehyde precondensate, are added as formaldehyde scavengers prior to the heating.

U.S. Pat. No. 7,714,031 B2 teaches the reduction of formaldehyde emissions by employing a molar melamine: formaldehyde ratio greater than 0.5, when preparing a foam from a melamine/formaldehyde precondensate.

WO 2018/024559 A1 discloses an aqueous polymer dispersion containing in an aqueous, anionically stabilized aliphatic polyurethane dispersion a formaldehyde scavenger, selected from disodium hydroxysulfonatoacetate, trimethylolpropane triacetoacetate, and malonic acid dihydrazide. The polymer dispersion is used for coating or gluing substrates or preparing films or foils as well as for impregnating textiles or leather materials.

WO 2017/207687, on the other hand, discloses a process for preparing polyurethanes by reacting polyisocyanates and polymeric compounds with groups reactive towards isocyanates in the presence of formaldehyde scavengers, like malonic acid dihydrazide.

Chemical compounds like 1,2-ethylene bis-acetoacetamide are also used as Michael donators in flame-retardant compositions, see for example WO 2015/197744 A1.

The reduction of the formaldehyde emission in the known polyurethane foams is not always satisfactory. Furthermore, by changing the composition of the reaction mixture while forming the polyurethane foam in order to adjust the formaldehyde emissions, a change in the production process in the polyurethane foam is necessary. This complicates the production of different kinds of polyurethane foam articles.

The object underlying the present invention is to overcome the disadvantages of the prior art and provide and easy way of imparting low formaldehyde emission to polyurethane foams and similar polymeric material moldings.

Additionally, the moldings, fibers or foils should show 0 ppm formaldehyde emission according to DIN EN 14184-1 and VDA 275, in their versions valid in 2019.

The objects are achieved according to the present invention by a method for lowering the formaldehyde emissions of melamine/formaldehyde polymer moldings, films or fibers by impregnating the melamine/formaldehyde polymer moldings, films or fibers with an aqueous solution of at least one formaldehyde scavenger.

The objects are furthermore achieved by a method for preparing melamine/formaldehyde polymer moldings, films or fibers with low formaldehyde emissions, by first preparing a molding, film or fiber of a melamine/formaldehyde polymer and subsequently impregnating the surface of the melamine/formaldehyde polymer molding, film or fiber with an aqueous solution of at least one formaldehyde scavenger.

Preferably, the melamine/formaldehyde polymer moldings are made from melamine/formaldehyde foams.

The objects are furthermore achieved by an aqueous solution for impregnating melamine/formaldehyde foams, containing a formaldehyde scavenger and being free from polyurethanes, melamine/formaldehyde polymers, or mixtures, prepolymers or monomers thereof.

Preferably, the solution contains 0.1 to 25 wt %, more preferably 1 to 25 wt %, of the formaldehyde scavenger, based on the total weight of the solution.

The objects are furthermore achieved by the use of this solution for impregnating melamine/formaldehyde polymer moldings, films ore fibers, preferably melamine/formaldehyde (polymer) foams or moldings made thereof.

The objects are furthermore achieved according to the present invention by shaped articles of melamine/formaldehyde foam, preferably having a formaldehyde emission of 0 ppm, determined according to DIN EN 14184-1 and VDA 275, obtainable by the following process:
  a) a foam is prepared from a melamine/formaldehyde precondensate,
  b) the foam obtained is annealed at below 250° C.,
  c) the annealed foam is impregnated with an aqueous solution of an formaldehyde scavenger,
  d) the impregnated annealed foam is dried,
  wherein the annealed foam can be shaped, e.g. by cutting or mechanical abrasion of the annealed foam, prior to or after impregnation, or
  wherein e.g. the annealed foam is molded in a press to give a shaped article, or
  wherein e.g. the foam is prepared in a mold of the desired shape.

The objects are furthermore achieved by a shaped article of melamine/formaldehyde foam impregnated with a formaldehyde scavenger, selected from acetoacetamide, molecules containing, preferably covalently linked, acetoacetamide groups, and mixtures thereof.

In the shaped article the amount of formaldehyde scavenger is preferably from 0.025 to 10 wt %, based on the impregnated melamine/formaldehyde foam.

Examples of shaping can be found for Basotect® TG and Basotect® G+.

Preferably, the amount of the formaldehyde scavenger or formaldehyde scavenger solution, based on the dried impregnated shaped article is from 0 to 50 wt %, more preferably 0.025 to 50 wt %, more preferably 0.05 to 25 wt %, most preferably from 0.1 to 15 wt %.

The amount of the formaldehyde scavenger compound, based on the shaped article, preferably foam molding, is preferably 0.025 to 10 wt %, more preferably 0.05 to 5 wt %, most preferably 0.1 to 2.5 wt %, for example 0.1 to 1 wt %.

As formaldehyde scavenger all suitable formaldehyde scavengers which reduce the formaldehyde emissions from the moldings can be employed which can form stable solutions in water. Preferably, the formaldehyde scavenger is selected from the group of C—H-acidic compounds and Schiff bases and C—H-acidic compounds that are Schiff bases.

For example, the formaldehyde scavenger is selected from the group consisting of acetoacetamide, ethylenediamine bis-acetoacetamide, trimethylolpropane triacetoacetate, malonic acid bis-amide, malonic acid dihydrazide, dimethyl 1,3-acetonedicarboxylate, 6-hydroxyuracil, N-methylacetoacetamide, N,N-dimethyl acetoacetamide, 2-cyano acetoacetamide, methyl cyanoacetate, 2-cyano-N-(2-hydroxyethyl)acetamide, methyl-2-(2-hydroxyethylcarbamoyl)ethanol, urea, substituted ureas, alkyl- or aryl-substituted melamine, ureates, carboxamides, dicyandiamide, guanidine, sulforyl amide, sulfonamides, aliphatic amines or glycols or mixtures thereof.

Suitable formaldehyde scavengers are disclosed in WO 2017/207687, WO 2018/024559, WO 2015/197744, and US 2008/0197524 A1.

Preferable, the formaldehyde scavenger is selected from acetoacetamide and compounds containing acetoacetamide groups.

Most preferably, the formaldehyde scavenger is selected from acetoacetamide and molecules containing, preferably covalently linked, acetoacetamide groups or units, like ethylenediamine bis-acetoacetamide, N-methylacetoacetamide, N,N-dimethyl acetoacetamide, 2-cyano acetoacetamide. Most preferably, acetoacetamide or ethylenediamine bis-acetoacetamide is employed. These compounds act as C—H-acidic compounds and Schiff bases and thus have a high reactivity towards formaldehyde which is higher compared to other scavenger compounds.

The formaldehyde scavenger is applied to the melamine/formaldehyde polymer molding, film or fiber by impregnating the surface of the respective moldings, film or fibers. Most preferably, the moldings are melamine/formaldehyde foams which are impregnated with the aqueous solution. Due to the high internal surface area, large amounts of the aqueous solution can be impregnated on the melamine/formaldehyde foam or foamed articles made of melamine/formaldehyde foams.

The aqueous solutions typically contain 0.1 to 50 wt %, preferably 0.1 to 25 wt %, more preferably 0.5 to 25 wt %, most preferably 1 to 20 wt % of the formaldehyde scavenger, based on the total weight of the solution.

Besides the one or more formaldehyde scavenger(s), the aqueous solutions can contain adjuvants, like surfactants or wetting agents, defoamers and mixtures thereof. If used, the aqueous solutions contain preferably up to 20 wt %, more preferably up to 10 wt % of additional components different from water and formaldehyde scavenger.

Aqueous solutions containing formaldehyde scavengers are known from the prior art cited above. However, these solutions contain polyurethanes, melamine/formaldehyde polymers or prepolymers or monomers employed in the preparation of polyurethanes or melamine/formaldehyde polymers. According to the present invention, prefabricated polyurethane foams are typically impregnated, so that the aqueous solution is free from polyurethanes, melamine/formaldehyde polymers or mixtures, prepolymers or monomers thereof. Preferably, the aqueous solutions are also free from ablative flame-retardant additives, like gas- or water-forming additives which are disclosed in WO 2015/197744 on pages 17 to 19. For example, the aqueous solutions are free from aluminium hydroxide, aluminium hydroxide hydrate, magnesium hydroxide and zinc borate.

Furthermore, the aqueous solutions are preferably free from multi-functional Michael acceptors, specifically as disclosed WO 2015/197744.

The aqueous solutions according to the present invention are furthermore preferably free from curing agents and blowing agents.

The melamine/formaldehyde polymer moldings, films and fibers can be prepared from melamine formaldehyde resins or preferably melamine formaldehyde foams. They can be prepared by a variety of processes, as disclosed for example in US 2008/0197524 A1, U.S. Pat. No. 7,714,034 B2 and US 2015/0210814 A1.

Suitable melamine/formaldehyde foams and foamed articles can be obtained as Basotect® from BASF SE. Further reference for this material can be made to EP 0 074 593 A1, EP 0 017 671 A1, EP 0 017 672 A1, EP 0 037 470 A1.

It is also possible to prepare the melamine/formaldehyde foam according to the process of U.S. Pat. No. 7,714,031 B2. In this manner, the formaldehyde emissions can be even further reduced.

The impregnating can be performed by all suitable processes, e. g. by immersing of the moldings in the aqueous solution containing the formaldehyde scavenger, by spraying the solution on the moldings or by other processes. The term "impregnating" means that the solution is brought into contact with the surface of the moldings in a manner that, upon subsequent drying, the formaldehyde scavenger is retained on or in the moldings.

The moldings, fibers or films, specifically, the melamine/formaldehyde foams obtained according to the present invention show a low formaldehyde emission according to DIN EN 14184-1 and VDA 275. Preferably, the emission can be reduced to below 0.0015 mg/m$^3$, more preferably below 0.0010 mg/m$^3$, specifically to 0 ppm. Furthermore, preferably, the long-term test according to the AgBB scheme (evaluation scheme of the German Committee for Health-related Evaluation of Building Products, AgBB) is fulfilled.

The present invention is further illustrated by the following examples.

EXAMPLES

A melamine/formaldehyde foam (Basotect®) was prepared according to Example 2 of US 2015/0210814 A1. The foam had a density of 8 to 10 g/l. A molding in the form of a foam sheet was cut from the melamine/formaldehyde foam.

A impregnating solution was prepared by dissolving 1 to 25 wt % of ethylenediamine-N,N'-bis(acetoacetamide) or of acetoacetamide in water. The impregnated active amount refers to the impregnated active without water, based on the dry foam.

The following results for the formaldehyde (FA) emission from the melamine/formaldehyde foam molding (Basotect®) were obtained:

| Impregnated active [wt %, based on foam molding] | 0.1 | 0.2 | 0.5 |
|---|---|---|---|
| mg FA/kg Basotect ® (acetoacetamide)* | 3 | 2 | 0 |
| mg FA/kg Basotect ® (ethylenediamine-N,N'-bis(acetoacetamide))* | 1 | 1 | 0 |

*Basotect ® reference without impregnation: 22

| Impregnated active [%] | 50 | 25 | 12 |
|---|---|---|---|
| mg FA/kg Basotect ® (acetoacetamide)* | 0 | 0 | 0 |
| mg FA/kg Basotect ® (ethylenediamine-N,N'-bis(acetoacetamide))* | 0 | 0 | — |

*Basotect ® reference with water impregnation: 162-171

Result of AgBB Test:
Emissions after 28 Days:

| | Basotect ® X1 (0.1% EA) | Basotect ® X2 (1% EA) | Basotect ® G+ | maximum (AgBB) |
|---|---|---|---|---|
| TVOC | <0.005 mg/m$^3$ | <0.005 mg/m$^3$ | <0.005 mg/m$^3$ | ≤1 mg/m$^3$ |
| TSVOC | <0.005 mg/m$^3$ | <0.005 mg/m$^3$ | <0.005 mg/m$^3$ | ≤0.1 mg/m$^3$ |
| Total carcinogens | <0.001 mg/m$^3$ | <0.001 mg/m$^3$ | <0.001 mg/m$^3$ | ≤0.001 mg/m$^3$ |
| Formaldehyde | <0.003 mg/m$^3$ | <0.003 mg/m$^3$ | 0.0055 mg/m$^3$ | ≤0.1 mg/m$^3$ |

EA: Ethylenediamine-N,N'-bis(acetoacetamide), amount in wt % based on the foam molding
Basotect ® G+: Melamine/formaldehyde foam molding without impregnation
Maximum (AgBB): The maximum values allowed by the AgBB test, the AgBB test was performed according to the art
TVOC: Total volatile organic compounds
TSVOC: Total semi-volatile organic compounds

The invention claimed is:

1. A method for lowering the formaldehyde emissions of melamine/formaldehyde polymer moldings made from melamine/formaldehyde foams by impregnating the melamine/formaldehyde polymer moldings made from melamine/formaldehyde foams with an aqueous solution a formaldehyde scavenger comprising ethylenediamine bis-acetoacetamide.

2. A method for preparing melamine/formaldehyde polymer moldings made from melamine/formaldehyde foams with low formaldehyde emissions, by first preparing a molding made from melamine/formaldehyde foams of a melamine/formaldehyde polymer and subsequently impregnating the surface of the melamine/formaldehyde polymer molding made from melamine/formaldehyde foams with an aqueous solution a formaldehyde scavenger comprising ethylenediamine bis-acetoacetamide.

* * * * *